US010597911B2

(12) United States Patent
Bendel et al.

(10) Patent No.: US 10,597,911 B2
(45) Date of Patent: Mar. 24, 2020

(54) MOTOR VEHICLE LOCKING MECHANISM

(71) Applicant: Kiekert AG, Heiligenhaus (DE)

(72) Inventors: Thorsten Bendel, Oberhausen (DE); Thorsten Nottebaum, Mühltal (DE)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 16/079,389

(22) PCT Filed: Jan. 24, 2017

(86) PCT No.: PCT/DE2017/100040
§ 371 (c)(1),
(2) Date: Aug. 23, 2018

(87) PCT Pub. No.: WO2017/144044
PCT Pub. Date: Aug. 31, 2017

(65) Prior Publication Data
US 2019/0055757 A1 Feb. 21, 2019

(30) Foreign Application Priority Data

Feb. 26, 2016 (DE) .................. 10 2016 103 422

(51) Int. Cl.
*E05B 81/66* (2014.01)
*E05B 81/06* (2014.01)
(Continued)

(52) U.S. Cl.
CPC .............. *E05B 81/66* (2013.01); *B60Q 3/267* (2017.02); *E05B 17/10* (2013.01); *E05B 81/06* (2013.01);
(Continued)

(58) Field of Classification Search
CPC .......... E05B 81/66; E05B 17/10; E05B 81/06; E05B 81/54; B60Q 3/267
(Continued)

(56) References Cited

U.S. PATENT DOCUMENTS 6,420,799 B1 * 7/2002 Sakamoto ................ H02J 1/06
307/10.1
2006/0290518 A1 12/2006 Bingle et al.

FOREIGN PATENT DOCUMENTS

DE 3908095 9/1989
DE 10121046 A1 11/2002
(Continued)

OTHER PUBLICATIONS

International Search Report and Written Opinion of PCT/DE2017/100040 dated Apr. 18, 2017.
(Continued)

*Primary Examiner* — Edwin A. Leon
*Assistant Examiner* — Iman Malakooti
(74) *Attorney, Agent, or Firm* — Renner, Otto, Boisselle & Sklar, LLP

(57) ABSTRACT

A method for controlling a motor vehicle locking mechanism and to a motor vehicle locking mechanism, in particular a motor vehicle door lock, comprising a control unit, at least one electric drive that can be controlled by the control unit, and at least one illuminant that can be associated with the locking mechanism, the illuminant being controllable in accordance with a status of the locking mechanism and/or of a vehicle component accommodating the locking mechanism, said status being detectable by the control unit, the illuminant being integrated into a switching circuit of the electric drive.

9 Claims, 3 Drawing Sheets

Figure 1:
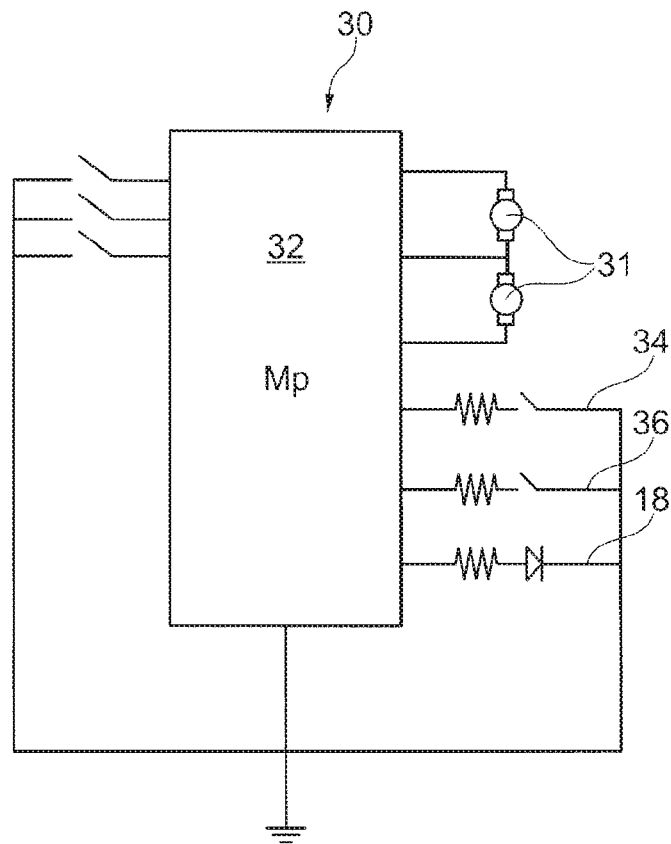

(51) Int. Cl.
    *E05B 17/10*     (2006.01)
    *E05B 81/54*     (2014.01)
    *B60Q 3/267*     (2017.01)
    *F21W 111/08*     (2006.01)

(52) U.S. Cl.
    CPC ......... *E05B 81/54* (2013.01); *E05Y 2400/854* (2013.01); *E05Y 2800/106* (2013.01); *E05Y 2900/512* (2013.01); *F21W 2111/08* (2013.01)

(58) Field of Classification Search
    USPC ..................................................... 200/61.64
    See application file for complete search history.

(56) References Cited

FOREIGN PATENT DOCUMENTS

| | | | | |
|---|---|---|---|---|
| DE | 202006004187 | * | 6/2006 | ............... B60J 5/10 |
| DE | 202008005174 | | 8/2009 | |
| DE | 102010016526 | A1 | 10/2011 | |
| WO | WO 2004113654 | | 12/2004 | |

OTHER PUBLICATIONS

International Preliminary Report on Patentability of PCT/DE2017/100040 dated Aug. 28, 2018.

* cited by examiner

MOTOR VEHICLE LOCKING MECHANISM

The invention relates to a motor vehicle locking mechanism, in particular a motor vehicle door lock, comprising a control unit, at least one electric drive, wherein the drive can be controlled by means of the control unit, at least one illuminant assigned to the locking mechanism, wherein the illuminant can be controlled dependent on a status of the locking mechanism which can be recorded by means of the control unit and/or can be controlled by means of a motor vehicle component accommodating the locking mechanism.

In order to attain the highest degree of safety for motor vehicles used in road traffic, there is a range of safety regulations. In particular, motor vehicle illumination has increasingly come into the foreground in recent years. There are thus already motor vehicles which have driving lights which also illuminate the motor vehicle in the daytime, thus increasing its visibility to road users. These lights are independent of the dipped headlights which are illuminated during the hours of darkness. The motor vehicle light is therefore a safety-related characteristic.

To further increase the safety of motorists and other road users, it is also known to execute an opening door and/or flap of a motor vehicle with an illuminant, reflectors or luminescent components so that the movements on the motor vehicle can be indicated to further road users by means of a light effect.

From DE 39 08 095 A1, rear lights and reflectors are known which indicate opening of the door or reflect light falling on the door during opening of the door or display as an illuminant that the door is open. A door set-up element is revealed which is equipped with different lights, such as a reading light, a rear light and a floor light. A rear light can also be integrated into an edge of the inlet slot, whereby the inlet slot is uniformly extended. All of these measures help to make road users aware of an open or opening door and thus guarantee traffic safety.

From DE 20 2008 005 174 U1, a Motor vehicle lock arrangement for a motor vehicle door has become known in which the Motor vehicle lock is formed with a light arrangement, wherein the light arrangement has an electrical light source, the light radiation of which can be emitted via an illuminating element. A light source is preferably revealed which interacts with a light conductor, which transmits the light of the light source to a light element, wherein the light element encompasses a lens to emit the light irradiation.

To control the illuminant, it has become known from WO 2004/113654 A1 to arrange a light diode in area of the Motor vehicle lock and in particular in the infeed section of the latch. When opening the door, the status of the latch is monitored or the status of the door handle ascertained, recorded by means of control electronics and the illuminant controlled. A microprocessor with control electronics works with switches and electric drives, wherein the control electronics monitor the status of the latch or the door and recognizes opening of the door, whereby the illuminant can be controlled simultaneously.

The controls known from the state of the art for energizing the illuminant have the disadvantage that the illuminant is supplied with power by means of a separate current path. Separate current paths require assembly space, complicate the construction of conductor path structures and rely on extended plug pins or assignments.

The object of the invention is to provide an improved motor vehicle locking mechanism which overcomes the disadvantages of the state of the art. Another object of the invention is to provide a structurally simpler and more cost-effective solution to control an illuminant in a motor vehicle locking mechanism.

The object is solved according to the invention by the characteristics of independent patent claim 1. Advantageous embodiments of the invention are stated in the sub-claims. It is pointed out that the exemplary embodiments described hereafter are not restrictive; instead, any possible variations are possible of the characteristics described in the description and the sub-claims.

According to patent claim 1, the object of the invention is solved by a motor vehicle locking mechanism being provided comprising a control unit, at least one electric drive, wherein the drive can be controlled by means of the control unit, at least an illuminant assigned to the locking mechanism, wherein the illuminant can be controlled dependent on a status of the locking mechanism which can be recorded by means of the control unit and/or can be controlled by means of a motor vehicle component accommodating the locking mechanism, and wherein the illuminant is integrated in the switching circuit of the electric drive. By means of integration of the illuminant into the switching circuit of the electric drive(s) the possibility is now created of providing an improved motor vehicle locking mechanism in which a smaller number of conductors is required so that the structural effort, in particular to configure the electronic connection of the illuminant, is simplified. To control or energize the electric drives in the motor vehicle locking mechanism control or voltage supply cables must be present in the locking mechanism which now according to the invention are simultaneously used to energize the illuminant and are thus assigned to a further function in the locking mechanism. The conductors which energize the electrical drives thus possess a dual function.

One purpose of the conductors is to energize the drives and the other purpose is for the conductors of the electric drives to be used in combination with control electronics to control the illuminant. This is made possible in particular because the electric drives are sometimes only temporarily controlled or supplied with voltage in order to generate or occupy, for example, a functional position desired by the operator in the locking mechanism. After operating or occupying the functional position by means of the electric drive, the electric drive is de-energized again or without voltage supply.

The motor vehicle locking mechanism is preferably a motor vehicle door lock. The motor vehicle door lock can, for example, be used in a door, flap, sliding door, cover and/or a glove compartment and can be used everywhere in the vehicle where components located on a motor vehicle are arranged in a mobile manner by means of a locking mechanism. The locking mechanism interacts with a control unit provided for in the motor vehicle which can also be called control electronics and preferably has a microprocessor to process the signals generated in the motor vehicle. Signals in the motor vehicle can, for example, be a status signal generated via a microswitch as to whether the microswitch is switched or unswitched. According to the signal of the microswitch, the position of a catch assigned to a locking mechanism in the locking mechanism can be recorded. All control and status signals are collected in the control unit and used to control the drives or the illuminants.

The locking mechanism is assigned to at least one electric drive. The electric drive can, for example, be an electromotor to control an electric child lock, a bolting unit and/or an anti-theft device. This enumeration is naturally not final, but only indicates an example of the use of electric drives and the possibility of the functions in the latch which can be set by the electric drive. It is crucial for the invention that the electricity- or voltage-conducting cables used for the electric drive are simultaneously used to supply electricity or voltage to the illuminant.

Light-emitting diodes can preferably be used as illuminants. These light-emitting diodes have the advantage that they are of small construction, cost-effective and robust enough in order to be used in a motor vehicle and in a motor vehicle lateral door, for example. The illuminant is controlled dependent on a status of the locking mechanism recorded by means of the control unit and/or a motor vehicle component accommodating the locking mechanism. The control unit records, for example, the opening of a flap on the motor vehicle and transmits a control signal to the illuminant so that by means of the illuminant the further road users can be made aware of the movement of the motor vehicle components.

In one embodiment of the invention, at least two drives, in particular electric drives, can be controlled by means of the control unit. Advantageously, the illuminant can be integrated into a switching circuit of one electric drive, of two electric drives or several electric drives. According to the invention, the control of the illuminant only requires a current-carrying conductor, wherein the power supply of the electric drives can be used. The electric drives are only controlled selectively or temporarily so that during the open state of the motor vehicle component bearing the locking mechanism the electric drives are usually not energized as the locking mechanism only recovers its function again after closure of the component. During the opening state of the component, such as a flap or a door, the electronic supply of the drives is not required and can be used to energize the illuminant.

If the status of the locking mechanism and/or the motor vehicle components accommodating the locking mechanism can be recorded by means of at least a microswitch, a further advantageous embodiment of the invention thus results. The locking mechanism is a motor vehicle door lock, for example. The motor vehicle components can be a tailgate or a sliding door, for example. It is advantageous that the position or the status of the locking mechanism and/or the motor vehicle component is recorded by means of microswitches. Microswitches are cost-effective and can easily be integrated into components of the motor vehicle. Furthermore, evaluation is easily possible by means of the control unit and it supplies a secure signal on the status so that reliable switching of the illuminant is enabled. Thus, for example, by means of a microswitch the position of a pawl assigned to a locking mechanism can be recorded, whereby a clear signal can be generated by means of the microswitch as to whether the locking mechanism and thus the locking mechanism is in a locked or unlocked position.

A locked position is present, for example, if a sliding door is locked. If the sliding door is opened by means of a handle, for example, such as a sliding door external handle, the locking mechanism is thus unlocked, whereby a latch holder interacting with the locking mechanism is released and the pawl assumes a position corresponding to the unlocked position of the locking mechanism. The position of the pawl is recorded by means of the microswitch, so that the illuminant can be controlled by means of the control unit.

In a further advantageous embodiment of the invention, the at least one electric drive and the at least one illuminant are integrated in a common switching circuit. In addition to a number of drives which, as described above, can engage an electric child lock, for example, several illuminants can also be used in the locking mechanism. It is advantageous that the illuminant is integrated in a switching circuit with the drive. This advantageously reduces the number of switching circuits required so that a reduced number of switching circuits is required which simplifies the switching diagram, in turn. It is advantageous in particular as it is necessary for different arrangements of the locking mechanisms, for example, mirror-inverted switching diagrams which can then be simplified. Mirror-inverted arrangements of switching diagrams or switching circuits are necessary, for example, if a locking mechanism should be used with an illuminant on a driver's side and a further locking mechanism with an illuminant on a passenger side.

In a further advantageous embodiment of the invention at least a voltage supply can be switched over, in particular switched over between a voltage supply and a mass. If, for example, two electric drives are provided for in the locking mechanism, the illuminant can thus be integrated into the switching circuit of the electric drives. To control the motors, an electricity- or voltage-carrying conductor is provided in each instance and the motors are connected to the motor vehicle mass. If the illuminant is now integrated into the switching circuit or the current path of one electric drive, by means of the control unit thus after recording of the signal to be switched on by the illuminant, the electric drives are energized on the one hand via the electricity-conducting path and also energize the cable lying on mass. In this case, the electric drives would not move.

Energization of the electric drives on both sides leads to standstill of the electric drives. However, as the illuminant has a mass connection, the illuminant is controlled or supplied with voltage and is able to emit light. By means of switching of the electric drives and in particular switchover of the mass to a current-conducting path the electric drives are functionless. However, the cables can be used to control the illuminant. Further current-carrying conductors in the locking mechanism can thus be dispensed with as the current-carrying paths of the electric drives are provided to supply voltage to the illuminant.

Advantageously, by means of the control unit to control the illuminant all voltage supply cables can be energized or have voltage supplied. The control unit is able to supply voltage to all voltage supply cables of the electric drives in the locking mechanism. Furthermore, the control unit is able to energize at least the mass for the electric drives. Hereby, the control unit, which can be arranged peripherally from the locking mechanism in the motor vehicle, can be switched over in such a way that the motors are energized via both connecting clamps. Direct current motors are preferably used in motor vehicles.

Direct current motors are generally known and have brushes, a commutator and a rotor in addition to the connecting clamps, wherein the rotor is pivotably accommodated in the stator so that a rotor shaft can be driven. If both connecting clamps are energized, the electric drive and in particular the direct current motor thus execute no rotational movement. The control unit thus has the possibility to disable the electric drive and simultaneously the possibility to use the power supply or voltage supply paths to supply the illuminants.

The illuminant is preferably an LED. The illuminant can also have a pre-stress controller so that voltage supply fluctuations in the operating network of the motor vehicle can be balanced. By means of a voltage supply controller, which is a resistance, for example, a voltage supply can be supplied to the illuminant or the light-emitting diode which enables uniform illumination by means of the illuminant in the locking mechanism. If the recordable status can be recorded by means of a microswitch assigned to a catch and/or a pawl, a further advantageous embodiment of the invention thus results. The recording of a position or a status of the catch or the pawl enables a very compact construction of the locking mechanism with an illuminant. Catches and/or pawls are used in locking mechanisms as locking mechanisms. If the status, i.e. the position of the catch is queried by means of a microswitch, a clear signal can thus be recorded regarding the state of the locking mechanism. An open, i.e. unlocked latch or a closed, i.e. locked locking mechanism can be present as states.

The object of the invention is furthermore to provide a procedure to control an illuminant in a locking mechanism. This object is solved according to the invention by means of patent claim 9.

According to the invention, a procedure to control an illuminant is provided in a motor vehicle, in which by means of a control unit a status of a latch is recorded and dependent on the recorded status all connections of a drive are supplied with voltage and in which the illuminant integrated in a switching circuit of the drives is supplied with voltage. By means of the procedure according to the invention the possibility is now created of providing a structurally simple procedure with which an illuminant is easy to integrate into existing latching systems. The mass of the direct current motors is only energized by means of the procedure so that the electric drives generate no rotational movement and thus malfunction of the functions is precluded in the locking mechanism.

In an advantageous embodiment of the procedure, the mass of the electric drive is energized. The control unit hereby switches the mass to an energy-conducting path and thus blocks a movement of the electric drives. A switchover consequently takes place between mass and power supply for direct current motors in the control unit.

The invention is described in further detail below with reference to the attached drawings on the basis of exemplary embodiments. However, the principle applies that the exemplary embodiments do not restrict the invention, but only constitute advantageous embodiments. The characteristics portrayed can be executed individually or in combination with other characteristics of the description and also the patent claims individually or in combination.

Figure 2:
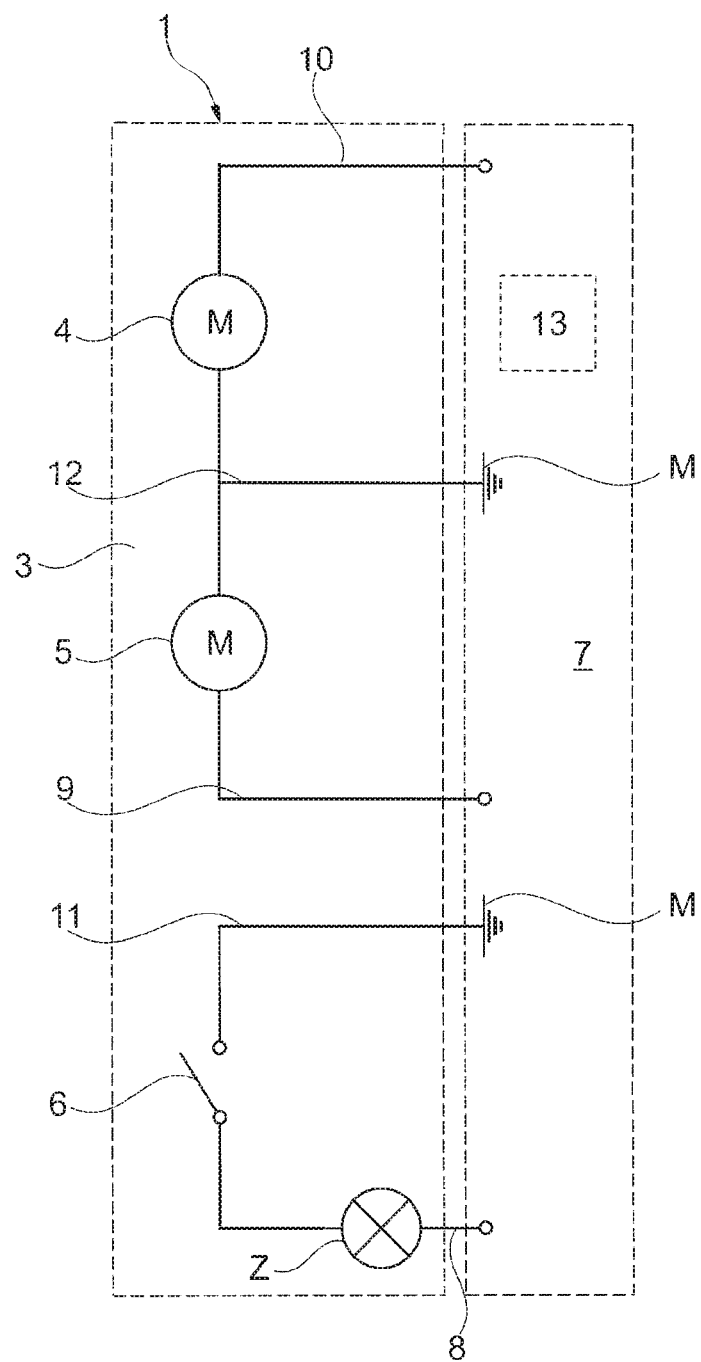

The following are shown:

FIG. 1 a theoretically illustrated switching diagram to control an illuminant according to the state of the art, FIG. 2 a theoretical illustration of a control of an illuminant in a motor vehicle and a theoretical drawing of a switching to include an illuminant in a current-conducting path or a cable of one electric drive according to the invention.

Figure 3:
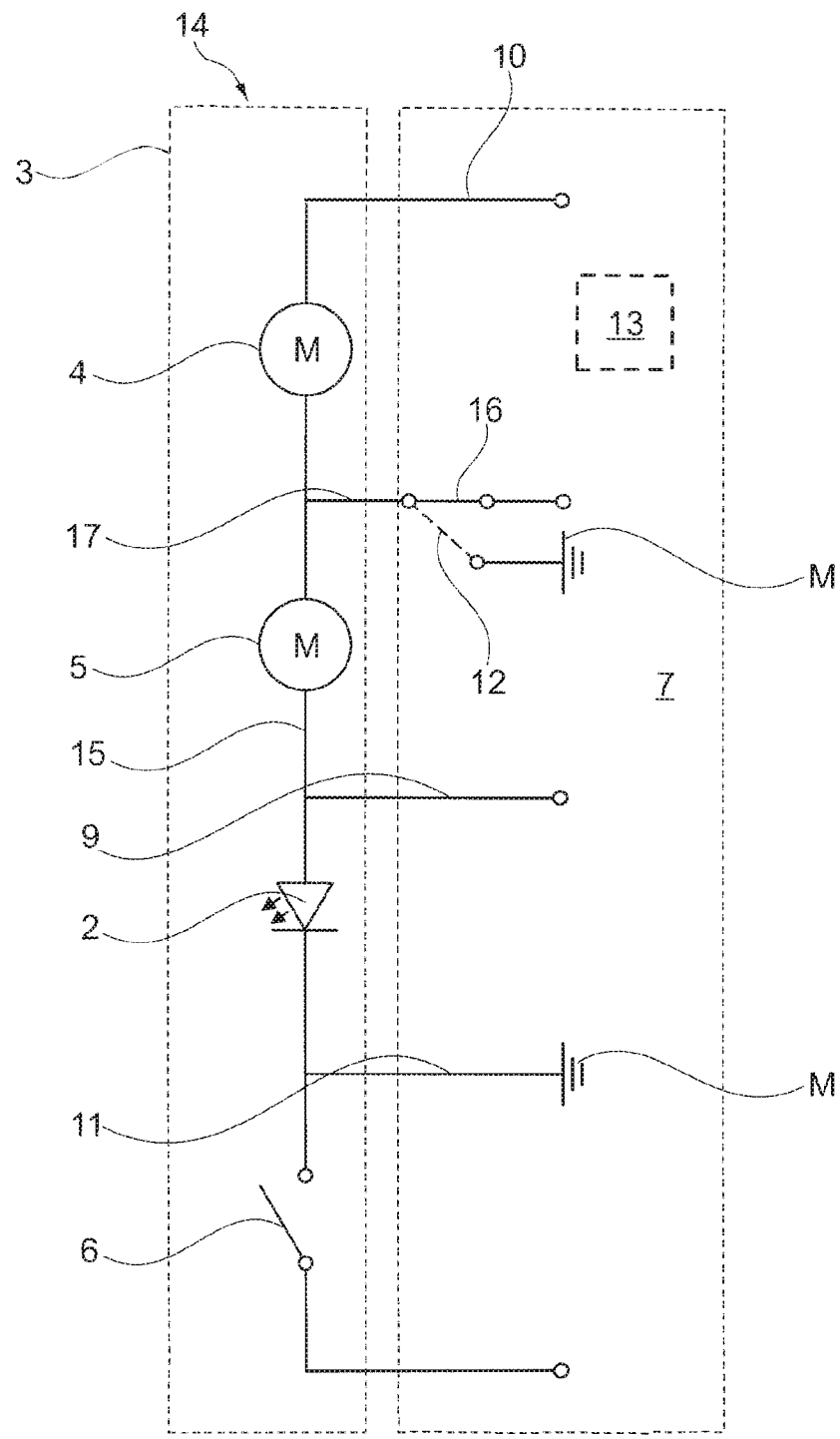

FIG. 3 a theoretical illustration of a motor vehicle lock in which the illuminant is integrated into a power circuit of electric drives.

In FIG. 1, a control unit 30 for a Motor vehicle lock is reproduced in a theoretical image according to the state of the art. The control unit 30 has a microprocessor 32 to which electric drives 31, microswitches 34, 36 and an illuminant 18 are connected. Both the status of the door handle and the status of the latch can be queried by means of the microswitch 34, 36. According to the status of the latch and/or the door handle, the illuminant 18 can be switched by means of the microprocessor 32. Electric drives 31 can also be controlled by means of the microprocessor 32. As is clearly apparent from FIG. 1, separate control cables are provided for the electric drives 31 and the illuminant 18.

In FIG. 2, a further diagrammatic switching diagram 1 is reproduced for control of an illuminant 2 of a Motor vehicle lock 3 which is only reproduced as a diagram. In this exemplary embodiment, the latch 3 has two electric drives 4, 5 and a switching means 6, which can be a microswitch, for example. The electric drives 4, 5 and the illuminant 2 can be controlled by means of a control unit 7. The illuminant 2 and the electric drives 4, 5 can be impinged with current, in particular direct current by means of conductors 8, 9, 10. The electric drives 4, 5 and the illuminant 2 are connected to the mass M of the motor vehicle by means of conductors 11, 12.

If the control unit 7, with a microprocessor 13 arranged therein, for example, receives a switching signal from the switching means 6, the illuminant 2 is supplied with voltage and switched on by means of the conductor 8. For example, the switching means 6 can be a catch switch, for example.

In FIG. 3, a diagrammatic switching diagram 14 of a Motor vehicle lock 3 is reproduced. The same components are equipped with identical reference signs. The crucial difference is that the illuminant 2 is integrated into the power circuit of the electric drives 4, 5. The current path 12, which connects the electric drives 4, 5 with the mass M is reproduced in this exemplary embodiment as a dot-dashed line. By means of a switching means or an electrical switching device, for example, the conductor 17 can be supplied with voltage.

If, for example, by means of the switching means 6 it is detected that the Motor vehicle lock is unlocked and the door can be opened, for example, the control unit 7 recognizes this and energizes the conductors 9, 10 and 17, wherein the switching means 16 is present in the position illustrated in FIG. 3. The electric drives 4, 5 are now supplied with direct current on both sides and do not malfunction. The illuminant 2 receives direct current via the conductor 9 and is connected via the conductor 11 to the mass M. The illuminant 2 can thus emit light and consequently illuminate the Motor vehicle lock 3 and/or illuminate in the direction of the environment of the motor vehicle.

As is clearly apparent, no separate conductor 8, 9, 10, 11, 12, 17 is necessary for the illuminant 2. This leads to a structurally simpler and a more cost-effective construction for a switching diagram with a Motor vehicle lock 3 equipped with an illuminant.

LIST OF REFERENCE SYMBOLS 1, 14 Switching diagram
2 Illuminant
3 Motor vehicle lock
4, 5 Electric drives
6, 16 Switching means
7 Control unit
8, 9, 10, 11, 12, 17 Conductors
13 Microprocessor
15 Power circuit
18 Illuminant
30 Control unit
31 Electric drive
32 Microprocessor
34, 36 Microswitch
M Mass

The invention claimed is:

1. A motor vehicle locking mechanism comprising:
a control unit,
at least one electric drive, wherein the electric drive can be controlled by the control unit, at least one illuminant that can be associated with the locking mechanism, wherein the illuminant is controllable based on a status of the locking mechanism and/or a vehicle component accommodating the locking mechanism which can be detected by the control unit, wherein the illuminant is integrated into a switching circuit of the electric drive, and a plurality of voltage supply cables that are supplied voltage by the control unit and configured to energize the illuminant.

2. The motor vehicle locking mechanism according to claim 1, wherein the at least one electric drive includes at least two drives that can be controlled by the control unit.

3. The motor vehicle locking mechanism according to claim 1, wherein the status of the locking mechanism and/or the vehicle components accommodating the locking mechanism can be detected by a microswitch.

4. The motor vehicle locking mechanism according to claim 1, wherein the at least one electric drive and the illuminant are integrated in a common switching circuit.

5. The motor vehicle locking mechanism according to claim 1, wherein at least a voltage supply can be switched over between a voltage supply and a mass.

6. The motor vehicle locking mechanism according to claim 1, wherein the illuminant is an LED.

7. The motor vehicle locking mechanism according to claim 1, wherein the detectable status can be detected by a microswitch corresponding to a catch and/or a pawl.

8. A method to control an illuminant is in a motor vehicle lock, the method comprising detecting a status of the motor vehicle lock;

supplying at least one electric drive of the motor vehicle lock with voltage based on the detected status of all connections in the motor vehicle lock; and supplying the illuminant, which is integrated in a switching circuit of the electric drive, with voltage.

9. The method according to claim 8 further comprising energizing a mass of the electric drive.

* * * * *